United States Patent
Benson et al.

(10) Patent No.: US 7,231,180 B2
(45) Date of Patent: Jun. 12, 2007

(54) AIRCRAFT ENGINE SENSOR NETWORK USING WIRELESS SENSOR COMMUNICATION MODULES

(75) Inventors: Dwayne M. Benson, Chandler, AZ (US); Haowei Bai, Burnsville, MN (US)

(73) Assignee: Honeywell International, Inc., Morristown, NJ (US)

( * ) Notice: Subject to any disclaimer, the term of this patent is extended or adjusted under 35 U.S.C. 154(b) by 482 days.

(21) Appl. No.: 10/808,630

(22) Filed: Mar. 24, 2004

(65) Prior Publication Data

US 2005/0213548 A1  Sep. 29, 2005

(51) Int. Cl.
*H04B 7/00* (2006.01)
*H04B 3/36* (2006.01)
*H04B 7/15* (2006.01)

(52) U.S. Cl. .................... 455/41.2; 455/7; 455/11.1

(58) Field of Classification Search ............... 455/41.2, 455/574, 522, 7, 343.1, 11.1, 39; 340/505, 340/517, 518, 500
See application file for complete search history.

(56) References Cited

U.S. PATENT DOCUMENTS

| | | | |
|---|---|---|---|
| 5,353,009 A * | 10/1994 | Marsh et al. ............... | 340/505 |
| 5,808,557 A | 9/1998 | Berge et al. | |
| 5,854,994 A | 12/1998 | Canada et al. | |
| 6,115,654 A | 9/2000 | Eid et al. | |
| 6,208,247 B1 | 3/2001 | Agre et al. | |
| 6,259,372 B1 | 7/2001 | Taranowski et al. | |
| 6,343,251 B1 | 1/2002 | Herron et al. | |
| 6,437,692 B1 | 8/2002 | Petite et al. | |
| 6,438,484 B1 | 8/2002 | Andrew et al. | |
| 6,469,639 B2 | 10/2002 | Tanenhaus et al. | |
| 6,470,258 B1 | 10/2002 | Leamy et al. | |
| 6,889,165 B2 * | 5/2005 | Lind et al. .................. | 702/183 |
| 6,950,767 B2 * | 9/2005 | Yamashita et al. ............. | 702/81 |
| 7,020,501 B1 * | 3/2006 | Elliott et al. ................. | 455/574 |
| 7,027,416 B1 * | 4/2006 | Kriz .......................... | 370/328 |
| 7,035,313 B2 * | 4/2006 | Fry ............................ | 375/132 |
| 7,071,029 B2 * | 7/2006 | Ghyselen et al. ........... | 438/107 |
| 2003/0063585 A1 | 4/2003 | Younis et al. | |
| 2005/0030921 A1 * | 2/2005 | Yau ............................ | 370/329 |
| 2006/0056370 A1 * | 3/2006 | Hancock et al. ............ | 370/338 |
| 2006/0178156 A1 * | 8/2006 | Kim .......................... | 455/466 |
| 2006/0187866 A1 * | 8/2006 | Werb et al. ................. | 370/311 |
| 2006/0189343 A1 * | 8/2006 | Park ........................... | 455/522 |

FOREIGN PATENT DOCUMENTS

WO  PCT/US2005/009554  9/2005

OTHER PUBLICATIONS

J.A. Gutierrez; "The IEEE Standard 802.15.4—enabling wireless sensor networks" Low-Rate Wireless Personal Area Networks, 2003, pp. 3, 90-93, XP008051553, New York.

Akyildiz, Su, Sankarasubramaniam, and Cayirci, "A Survey On Sensor Networks" IEEE Communications Magazine, Aug. 2002, pp. 102-114, XP-001142609, Piscataway, New Jersey.

* cited by examiner

*Primary Examiner*—Sonny Trinh
(74) *Attorney, Agent, or Firm*—Ingrassia Fisher & Lorenz

(57) ABSTRACT

A wireless communication module is used to implement an ad-hoc wireless sensor network. The wireless communication module is configured to interface with numerous and varied types of sensors and, in one particular embodiment, is used to implement an ad-hoc wireless sensor network for an aircraft engine. The modules are also configured to implement various functions to optimize ad-hoc network functionality and to minimize the electrical power dissipated by each module in the ad-hoc network.

58 Claims, 3 Drawing Sheets

AIRCRAFT ENGINE SENSOR NETWORK USING WIRELESS SENSOR COMMUNICATION MODULES

FIELD OF THE INVENTION

The present invention relates to sensor networks and, more particularly, to a wireless communication module that may be used to implement an ad-hoc wireless sensor network, and that provides a standard interface with numerous types of sensors.

BACKGROUND OF THE INVENTION

Modern physical systems, such as those used in aircraft, are becoming more and more complex. This increase in system complexity has led to an increased desire for automated prognostic and health monitoring systems. Many prognostic and health monitoring systems receive signals or data representative of one or more physical parameters from various components and/or subsystems within a system. The prognostic and health monitoring systems may then use the signals or data to, for example, predict future system performance and/or detect or predict potential component or subsystem faults.

One particular aircraft system in which prognosis and health monitoring capability is becoming increasingly desirable is aircraft engine systems. To provide such capability, however, several sensors of varying types may be mounted on the engine to sense various physical parameters associated with engine operation. These sensors may be coupled to a central processing unit such as, for example, a Full Authority Digital Engine Controller (FADEC) using wiring and multiple wiring harnesses. These wiring and wiring harnesses used to couple the sensors to the central processing unit can increase overall system weight and cost, and can reduce overall system reliability.

Hence, there is a need for a system and method of providing signals and/or data representative of various aircraft engine parameters that does not use wiring and multiple wiring harnesses and/or reduces the overall impact on system weight and cost and/or does not reduce overall system reliability. The present invention addresses one or more of these needs.

SUMMARY OF THE INVENTION

The present invention provides a wireless sensor communication module that may be used to implement an ad-hoc wireless sensor network. In one embodiment, and by way of example only, a wireless sensor communication module for operating in a sensor network having a plurality of nodes includes a controller and a transceiver. The controller is configured to receive power capability data representative of power capability of other sensor communication modules in the sensor network and is operable, in response thereto, to determine a data transmission route through the sensor network based at least in part on the power capability data, and to supply transmission route data representative thereof. The transceiver is configured to receive sensor data and is operable to modulate the sensor data with an RF signal to thereby generate RF modulated sensor data. The transceiver is additionally coupled to receive the transmission route data and is operable, in response thereto, to transmit the RF modulated sensor data to a sensor network node in the determined transmission route.

In another exemplary embodiment, an ad-hoc sensor communication network includes a plurality of wireless sensor communication modules. Each communication module is in operable communication with one or more other wireless sensor communication modules in the sensor communication network, and each communication module includes a sensor, a controller, and a transceiver. The sensor is operable to sense a physical parameter and supply sensor data representative thereof. The controller is configured to receive power capability data representative of power capability of other sensor communication modules in the sensor network and is operable, in response thereto, to determine a data transmission route through the sensor network based at least in part on the power capability data, and to supply transmission route data representative thereof. The transceiver is configured to receive the sensor data and is operable to modulate the sensor data with a radio frequency (RF) signal to thereby generate RF modulated sensor data. The transceiver is additionally coupled to receive the transmission route data and is operable, in response thereto, to transmit the RF modulated sensor data to a sensor network node in the determined transmission route.

In yet another exemplary embodiment, an ad-hoc aircraft engine sensor communication network includes a plurality of wireless sensor communication modules in operable communication with one or more other wireless sensor communication modules in the aircraft engine sensor communication network. Each wireless sensor communication module includes a sensor, a module controller, and a transceiver. The sensor is configured to couple to an aircraft engine and is operable to sense a physical parameter associated with the aircraft engine and supply sensor data representative thereof. The module controller is configured to receive power capability data representative of power capability of other wireless sensor communication modules in the aircraft engine sensor network and is operable, in response thereto, to determine a data transmission route through the aircraft engine sensor network based at least in part on the power capability data, and to supply transmission route data representative thereof. The transceiver is configured to receive the sensor data and is operable to modulate the sensor data with a radio frequency (RF) signal to thereby generate RF modulated sensor data. The transceiver is additionally coupled to receive the transmission route data and is operable, in response thereto, to transmit the RF modulated sensor data to a network node in the determined transmission route.

In yet still another exemplary embodiment, a method of transmitting sensor data in an ad-hoc wireless sensor network having a plurality of nodes, and in which each node has a power capability associated therewith, includes determining the power capability of at least a portion of the other nodes in the wireless sensor network. A data transmission route through the wireless sensor network is determined based at least in part on the determined power capability. Sensor data is radio frequency (RF) modulated to thereby generate RF modulated sensor data. The RF modulated sensor data is transmitted to a node in the determined data transmission route.

Other independent features and advantages of the preferred communication module, ad-hoc engine sensor network, and methods will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background of the invention or the following detailed description of the invention. In this regard, although the present embodiment is, for ease of explanation, depicted and described as being implemented in a multi-spool turbofan gas turbine jet engine system, it will be appreciated that it can be implemented in various other end-use systems and environments.

Figure 1:
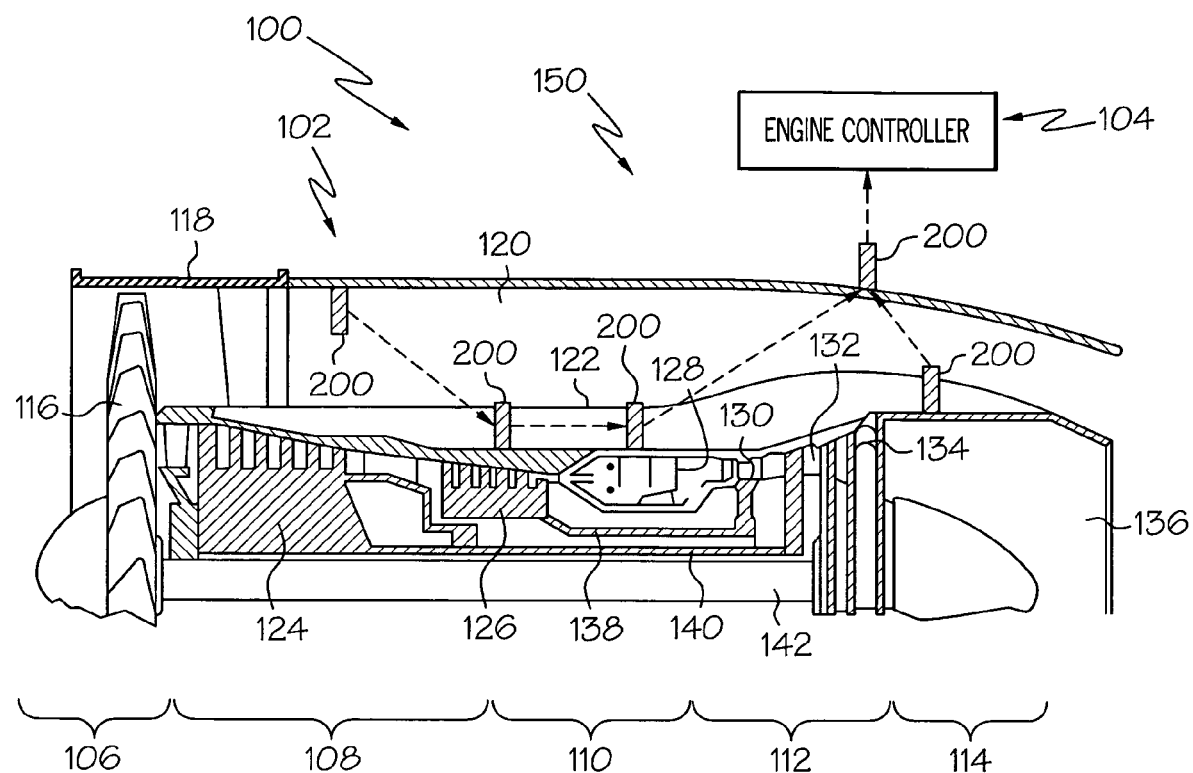
FIG. 1 is a simplified schematic representation of an exemplary embodiment of an ad-hoc aircraft engine sensor communication system 100 coupled to an aircraft engine.

Turning now to the description and with reference first to FIG. 1, a simplified cross section view of an exemplary aircraft engine sensor communication system 100 is shown, and includes an aircraft engine 102 and an engine controller 104. In the depicted embodiment, the aircraft engine 102 is a multi-spool turbofan gas turbine engine. It will be appreciated, however, that this type of engine is merely exemplary of any one of numerous types of aircraft engines that may be used. For completeness of explanation, a brief description of the depicted engine 102 will now be provided.

In the depicted embodiment, the engine 102 includes an intake section 106, a compressor section 108, a combustion section 110, a turbine section 112, and an exhaust section 114. The intake section 106 includes a fan 116, which is mounted in a fan case 118. The fan 116 draws air into the intake section 106 and accelerates it. A fraction of the accelerated air exhausted from the fan 116 is directed through a bypass section 120 disposed between the fan case 118 and an engine cowl 122, and provides a forward thrust. The remaining fraction of air exhausted from the fan 116 is directed into the compressor section 108.

The compressor section 108 includes two compressors, an intermediate pressure compressor 124, and a high pressure compressor 126. The intermediate pressure compressor 124 raises the pressure of the air directed into it from the fan 116, and directs the compressed air into the high pressure compressor 126. The high pressure compressor 126 compresses the air still further, and directs the high pressure air into the combustion section 110. In the combustion section 110, which includes a plurality of combustors 128, the high pressure air is mixed with fuel and combusted. The combusted air is then directed into the turbine section 112.

The turbine section 112 includes three turbines disposed in axial flow series, a high pressure turbine 130, an intermediate pressure turbine 132, and a low pressure turbine 134. The combusted air from the combustion section 110 expands through each turbine, causing it to rotate. The air is then exhausted through a propulsion nozzle 136 disposed in the exhaust section 114, providing addition forward thrust. As the turbines rotate, each drives equipment in the engine 102 via concentrically disposed shafts or spools. Specifically, the high pressure turbine 130 drives the high pressure compressor 126 via a high pressure spool 138, the intermediate pressure turbine 132 drives the intermediate pressure compressor 124 via an intermediate pressure spool 140, and the low pressure turbine 134 drives the fan 116 via a low pressure spool 142.

The engine controller 104, as is generally known, is used to control the output power of the engine 102 by, for example, controlling fuel flow rate to the engine 102, as well as controlling airflow through the engine 102. In the depicted embodiment, the engine controller 104 also receives signals from a plurality of wireless wireless sensor communication modules 200 that are disposed at various locations on and within the engine 102. The sensors 200 are used to sense various physical parameters associated with the engine 102 and its operation, and supply signals representative of the sensed parameters to the engine controller 104. The engine controller 104 processes the signals received from the wireless wireless sensor communication modules 200 and, among other things, preferably implements a prognostic and health monitoring function for the engine 100. It will be appreciated that the engine controller 104 may be any one of numerous types of engine controllers, but in the depicted embodiment it is preferably a FADEC (Full Authority Digital Engine Controller).

The wireless sensor communication modules 200 and engine controller 104 are each nodes of an ad-hoc wireless sensor communication network 150, in which each wireless sensor communication module 200 can communicate directly with the engine controller 104 or with one or more other wireless sensor communication modules 200 within the network. A detailed description of a particular preferred embodiment of a wireless wireless sensor communication module 200, and the functionality it implements, will now be described in more detail. In doing so, reference should be made to FIGS. 2–6.

Figure 2:
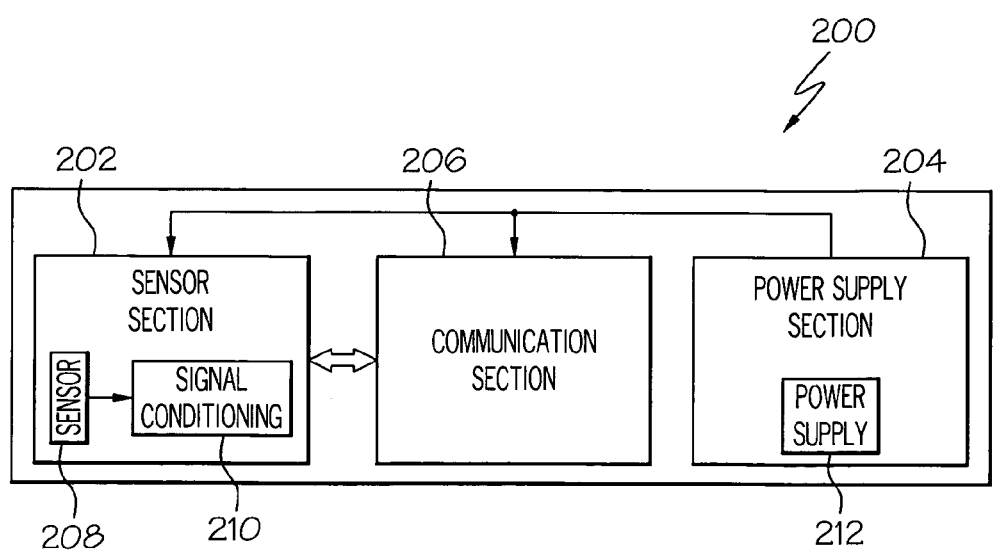
FIG. 2 is a functional block diagram of an exemplary wireless sensor communication module that may be used in the system of FIG. 1.

Turning first to FIG. 2, a functional block diagram of the wireless wireless sensor communication module 200 according to a particular preferred embodiment is shown. In the depicted embodiment, the wireless wireless sensor communication module 200 includes three main sections, a sensor section 202, a power supply section 204, and a communication section 206. The sensor section 202 includes one or more sensors 208 and appropriate signal conditioning circuitry 210. The sensor 208 may be any one of numerous types of sensors including, but not limited to, a temperature sensor, a pressure sensor, a vibration sensor, a proximity sensor, and a position sensor, or a combination of both. The sensor 208 senses one or more physical parameters at or near its location on or within the engine 102, and generates a sensor signal representative of the sensed physical parameter (or parameters).

The signal conditioning circuitry 210 receives the sensor signal from the sensor 208 and conditions the sensor signal, as appropriate, for further conditioning and/or processing in the communication section 206. It will be appreciated that the particular type of signal conditioning implemented by the signal conditioning circuitry 210 may vary depending on the particular type of sensor 208 that is being used. It will additionally be appreciated that, in some instances, the signal conditioning circuitry 210 may be bypassed or not used at all, or the appropriate signal conditioning may be implemented in the communication section 206.

The power supply section 204 includes an electrical power supply 212, which is used to supply power to the sensor section 202 and the communication section 206. The power supply 212 may be any one of numerous types of stand-alone electrical power supplies. For example, the power supply 212 may include one or more batteries and appropriate signal conditioning circuitry, or it may be a thermoelectric power supply that is driven by temperature gradients on the engine 100, or it may be a vibration-powered generator that is driven by engine vibration and converts mechanical power to electrical power. In a particular preferred embodiment, the power supply 212 is implemented as a vibration-powered generator and, for completeness, a particular preferred embodiment of this generator will now be described in more detail.

Figure 3:
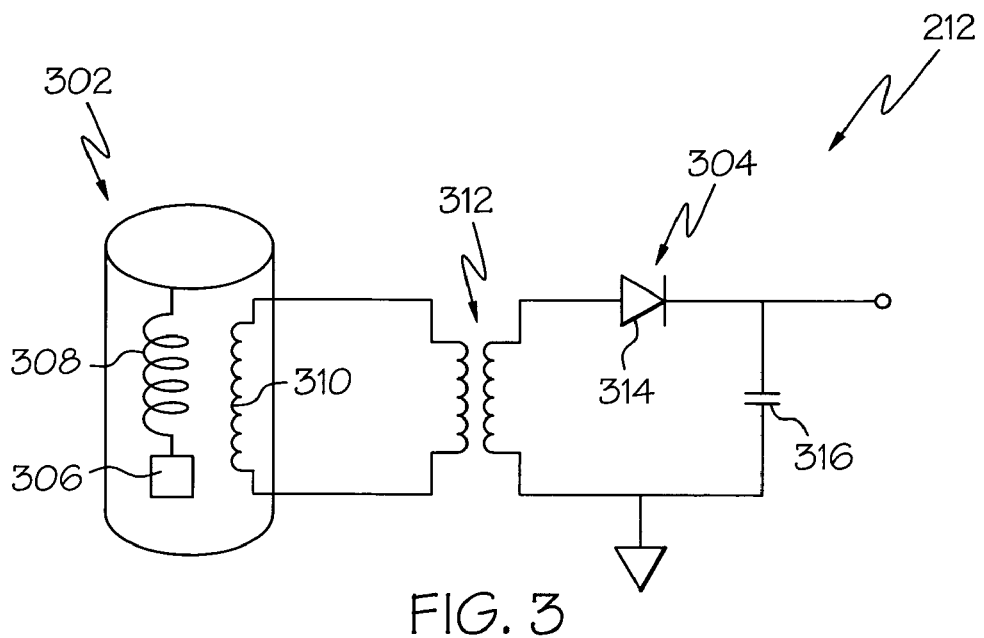
FIG. 3 is a simplified schematic diagram of an exemplary power supply that may be used in the sensor communication module of FIG. 2.

The power supply 212, a particular preferred embodiment of which is depicted in FIG. 3, is preferably implemented using micro electro mechanical system (MEMS) technology, and includes a generator 302 and appropriate signal conditioning circuitry 304. The generator 302 is preferably implemented as a spring-loaded magnetic mass generator, which includes a magnetic mass 306, a spring 308, and a coil 310. The spring 308 is coupled to the magnetic mass 306, and allows controlled and predictable movement of the magnetic mass 306 when the magnetic mass 306 is mechanically excited by, for example, engine vibrations. As the magnetic mass 306 moves, it generates an AC (alternating current) voltage in the coil 310 in accordance with well-known electromagnetic principles.

The AC voltage that is generated in the coil 310 is supplied to the signal conditioning circuitry 304, which in the depicted embodiment includes a transformer 312, a rectifier 314, and a capacitor 316. The transformer 312 steps up the AC voltage to a desired magnitude, the rectifier 314 rectifies the AC voltage to a DC voltage, and the capacitor 316 filters and appropriately stores electrical energy, which is distributed to the sensor section 202 and communication section 206 via appropriate conductors.

It will be appreciated that the power supply 212 depicted in FIG. 3 and described above is merely exemplary of any one of numerous types of vibration-powered generators. It will additionally be appreciated that the use of MEMS technology is merely exemplary of a particular preferred embodiment, and that the generator 302 may be implemented in any one of numerous other ways, using any one of numerous other technologies.

Figure 4:
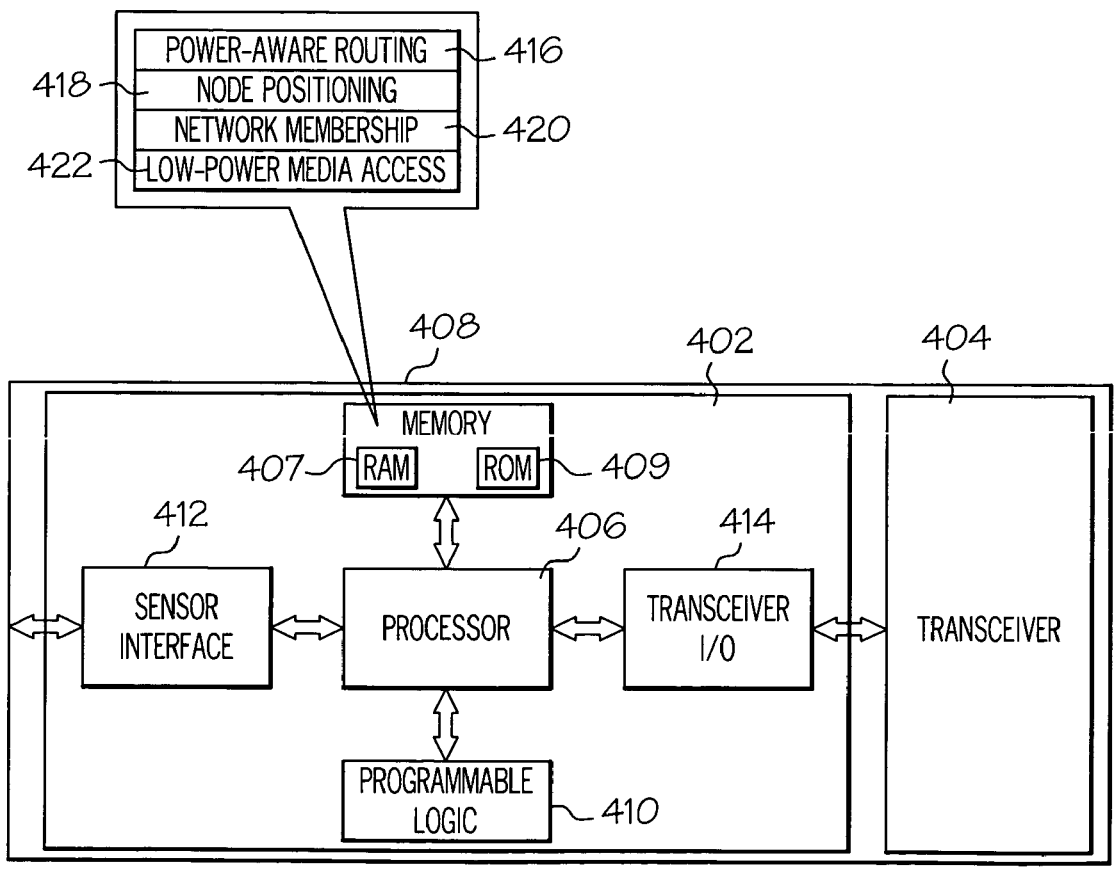
FIG. 4 is a block diagram of an exemplary communication section that may form part of the sensor communication module of FIG. 2.
Figure 5:
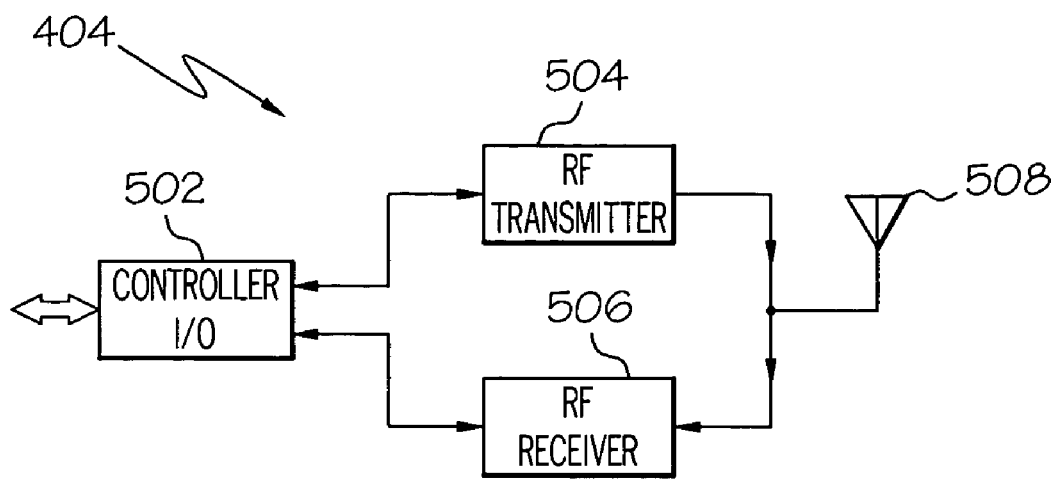
FIG. 5 is a functional block diagram of an exemplary transceiver that may form part of the communication section of FIG. 4.

Returning now to the description of the wireless wireless sensor communication module 200, and with reference to FIG. 4, a description of the communication section 206 will now be provided. The communication section 206 is configured to receive the sensor signals, which may be appropriately conditioned, from the sensor section 202, and to appropriately RF modulate the sensor signals for transmission to the engine controller 104. As will be described in more detail further below, the transmission from the communication section 206 to the engine controller 104 may be either direct, or via one or more other wireless sensor communication modules 200.

To accomplish the above-mentioned functions, the communication section 206 includes a communication controller 402 and a transceiver 404. In the depicted embodiment, the communication controller 402 includes, among other things, a processor 406, memory 408, programmable logic 410, a sensor interface 412, and a transceiver I/O 414. It will be appreciated that the memory 408 may include either, or both, RAM (random access memory) 407 and ROM (read only memory) 409.

The processor 406 may be any one of numerous known general purpose processors or an application specific processor that operates in response to program instructions. Such program instructions may be stored in the memory 408, in either or both the RAM 407 and the ROM 409. For example, the operating system software may be stored in the ROM 409, whereas various operating mode software routines and various operational parameters may be stored in the RAM 407. It will be appreciated that this is merely exemplary of one scheme for storing operating software and software routines, and that various other storage schemes may be implemented. It will also be appreciated that the communication controller 402 may be implemented using various other circuits, not just a programmable processor. For example, digital logic circuits and analog signal processing circuits could also be used. It will be further appreciated that the memory 408 could be integrally formed as part of the processor 406.

The processor 406 is coupled to receive sensor data representative of the sensor signals supplied from each sensor 208 that forms part of the sensor section 202. In the depicted embodiment, the sensor data are supplied to the processor 406 via the sensor interface 412. The interface 412, which may be implemented in either hardware, software, or a combination of both, is coupled to receive the sensor signals, and is configured to implement a data buffer or data cache. The interface is further configured to allow the processor 406 to receive and process sensor data from various types of sensors. Although the interface 412 is described herein as implementing the data buffer/data cache function, it will be appreciated that this function could be implemented using a separate device, or it could be embedded in the processor 406. The processor 406, implementing appropriate processing software, supplies the received sensor data to the transceiver 404 via the transceiver I/O 414, which may also be implemented in either hardware, software, or a combination of both. As will be described in more detail further below, the transceiver 404 modulates and transmits the sensor data to one or more nodes in the sensor communication network 150, as commanded and controlled by the processor 406 and/or programmable logic 410. The processor 406 and/or programmable logic 410 also implement various other command and control functions, some of which are based on data received from the transceiver 404. These additional command and control functions will be described in more detail further below. Before doing so, however, a detailed description of the transceiver 404 will first be provided.

The transceiver 404 may be implemented using any one of numerous transceiver configurations, and in the depicted embodiment includes an I/O interface 502, an RF transmitter 504, and an RF receiver 506. The I/O interface 502 functions to provide control and data transfer between the communication controller 402 and the transceiver 404. The I/O interface 502, in response to commands from the controller 402, controls the overall functionality of the transceiver 404. For example, the I/O interface 502 configures the transceiver 404 to either transmit data or receive data. In some embodiments, the I/O interface 502 also controls, among other things, the operating frequency, transmission power, and reference frequency of the transceiver 404.

The RF transmitter 504 receives data from the I/O interface 502, RF modulates the data and, when commanded to do so by the I/O interface 502, transmits the RF modulated data, via an RF antenna 508, to one or more other nodes in the sensor communication network 150. The transmitter 504 can be configured to implement any one of numerous types of RF modulation schemes including, for example, QPSK (Quarternary Phase Shift Key). However, in a particular preferred embodiment the RF transmitter is configured to implement the BFSK (Binary Phase Shift Key) modulation scheme. The RF transmitter 504 may additionally be configured to implement any one of numerous types of multiple access schemes including, but not limited to, fixed-frequency radio transmission, Time Division Multiple Access (TDMA), Frequency Division Multiple Access (FDMA), Direct Sequence Spread Spectrum (DSSS) radio transmission, or Frequency Hopping Spread Spectrum (FHSS). In a particular preferred embodiment, the RF transmitter 504 implements FHSS transmission.

The RF receiver 506, in response to commands from the I/O interface 502, receives RF modulated data from one or more other nodes in the sensor communication network 150, via the antenna 508. The RF receiver 506 demodulates the received RF modulated data and supplies the demodulated data to the I/O interface 502. As will be described in more detail further below, the I/O interface 502 either supplies some or all of the demodulated data to the communication controller 402, and/or supplies some or all of the demodulated data to the RF transmitter 504, where it is once again RF modulated and transmitted to another one or more other nodes in the sensor communication network 150.

The transceiver 404 may be implemented using discrete components, integrated circuit components, or a combination thereof, and to operate at any one, or multiple, frequencies in the RF spectrum. Moreover, if implemented using an integrated circuit, the transceiver 404 may be any one of numerous known transceiver integrated circuits or an application specific integrated circuit. In a particular preferred embodiment, the transceiver 404 is implemented using an integrated circuit in the HRF-ROC093XX family of integrated circuits, which are manufactured and sold by Honeywell International, Inc.

As was previously noted, the processor 406 and/or programmable logic 410 implement various command and control functions, some of which are based on data supplied to the communication controller 402 from the transceiver 404. These command and control functions, which are represented as modules that are implemented in software stored in memory 408 include a power aware routing module 416, a node positioning module 418, a network membership module 420, and a low-power media access module 422. It will be appreciated that one or more of these modules, or at least portions thereof may also be implemented in that may be implemented hardware, firmware, or a combination thereof. Each of these modules will now be described, beginning first with the power aware routing module 416.

The power aware routing module 416 determines the power capability of the wireless wireless sensor communication module 200 on which the power aware routing module 416 is resident, and uses data representative of the power capability data of other communication modules 200 to determine a preferred data transmission path. For example, the power aware routing module 416 may use data from the power supply section 204 to determine the amount of power remaining in the power supply section 214 and the amount of time this amount of power will be available. The power aware routing module 416 may also receive data representative of a fault that may prevent the wireless wireless sensor communication module 200 from being fully utilized. The communication controller 402, based on the power capability determination made by the power aware routing module 416, supplies data representative of the power capability of the wireless wireless sensor communication module 200 to the transceiver 404. The transceiver 404 in turn, and when commanded to do so by the communication controller 402, transmits the power capability data. Preferably, the power capability data is transmitted simultaneous with the sensor data, as well as other data, which are discussed in more detail below.

It will be appreciated that the power capability determination can be made on a continuous basis, or at a predetermined periodicity that may be programmed into the power aware routing module 416. Moreover, the communication controller 402 can command the transceiver 404 to transmit the power capability data each time sensor data is transmitted, which was mentioned above as being preferable, or to transmit the power capability data at a predetermined periodicity, or to transmit the data upon occurrence of a predetermined event. An example of this latter instance may be if, as described above, a fault is detected in the wireless wireless sensor communication module 200 that would require the communication module to shutdown, go off-line, or otherwise prevent or inhibit it from being used. In such an instance, power capability data may be transmitted by the wireless wireless sensor communication module 200 before it shuts down, goes off-line, or otherwise becomes less than fully operable, indicating that the wireless wireless sensor communication module 200 cannot be used to transmit data.

In addition to transmitting power capability data, the wireless wireless sensor communication module 200 also receives the power capability data that is transmitted from all, or at least a portion, of the other wireless sensor communication modules 200 in the sensor network 150. The power capability data received by transceiver 404 in each communication module 200 is supplied to the communication controller 402 where it is made available to the power aware routing module 416. The power aware routing module 416 uses the power capability data it receives to determine a data transmission route through the sensor network 150. In particular, the power aware routing module 416 determines a data transmission route that preferably routes the transmitted data to its intended destination using, if necessary, other wireless sensor communication modules 200 that have the greatest power capability.

Figure 6:
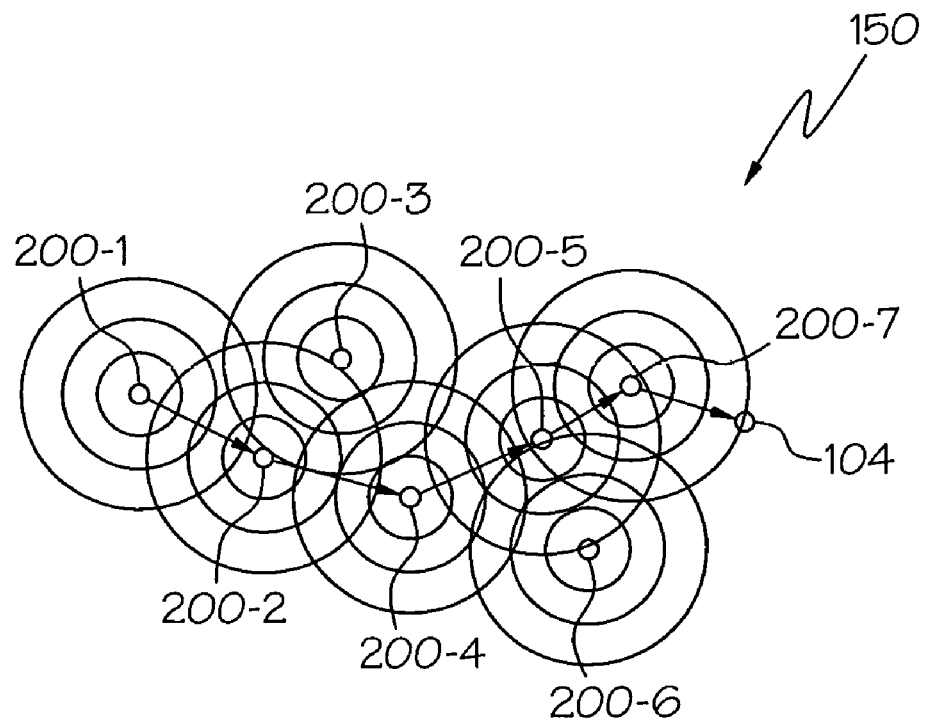
FIG. 6 is a simplified representation of a sensor communication network transmitting data from a sensor communication module to an engine controller, according to an embodiment of the present invention.

This functionality of the power aware routing module 416 is illustrated in FIG. 6, which depicts a sensor communication network 150 having eight nodes that include seven wireless sensor communication modules 200 (e.g., 200-1 through 200-7) and the FADEC 104. As FIG. 6 illustrates, each wireless wireless sensor communication module 200 transmits its own power capability data to, and receives power capability data from, one or more other communication modules 200. Each communication module 200 also preferably transmits the power capability data it receives from other wireless sensor communication modules 200. Based on the power capability data each wireless wireless sensor communication module 200 receives, it determines the optimum data transmission route through the sensor communication network 150. Thus, in the example shown in FIG. 6, it was determined that sensor data from wireless wireless sensor communication module 200-1 should be routed to the FADEC 104 via wireless sensor communication modules 200-2, 200-4, 200-5, and 200-7.

It will be appreciated that the power aware routing module 416, and the functionality it implements, may be used alone or in conjunction with any one of numerous other data transmission routing schemes. For example, the power aware routing module 416 could be implemented in conjunction with, for example, ad-hoc on-demand distance vector routing (AODV), dynamic source routing (DSR), and global state routing (GSR), just to name a few. The power aware routing module 416, when used in conjunction with these other schemes, provides an added level of enhancement to these other routing schemes.

Turning flow to the node positioning module 418, it will be appreciated that each wireless wireless sensor communication module 200, in addition to transmitting sensor data and power capability data, also transmits data representative of position. This position data may be representative of, for example, the actual physical location of the wireless wireless sensor communication module 200, the actual physical location of the sensor 208 coupled to the wireless wireless sensor communication module 200, or the physical location of the region or device where the parameter being sensed. If the wireless wireless sensor communication module 200 is located in a fixed position, for example at a specific location on or within the engine 102, then this position data will likely be constant. If, however, the wireless sensor communication module 200 is located such that its position may change, then the position data will also change. In this latter instance, the communication sensor module 200 will preferably include some type of position sensing capability as well that will generate and update the position data that it transmits. Similar to the power capability data, each wireless sensor communication module 200 in the network 150 preferably transmits its position data to, and receives position data from, some or all of the other wireless sensor communication modules 200 in the network 150. Moreover, the position data is preferably transmitted simultaneously with the sensor data and the power capability data. The position data allows a receiving node, be it a sensor communication module or the engine controller 104, to determine from whence the sensor data came.

The network membership module 420 provides identification and/or authentication functionality for each wireless sensor communication module 200. The network membership module 420 supplies identification data that uniquely identifies the wireless sensor communication module 200, and identifies its membership, or potential membership, in the network 150. This identification data is preferably transmitted simultaneously with the sensor data, power capability data, and position data. The wireless sensor communication module 200 also receives identification data from some or all of the other wireless sensor communication modules 200 in the network 150. The network membership module 420 uses the received identification data to determine if the wireless sensor communication module 200 that transmitted the identification data is a member of the network 150. The network membership module 420 also preferably determines the identification, and number, of wireless sensor communication modules 200 that are presently active in the network 150. In addition, the network membership module 420 also determines when a wireless sensor communication module 200 joins the network 150, and when a wireless sensor communication module 200 drops off the network 150.

Moreover, it was previously noted that the identification data identifies the wireless sensor communication module 200 as a member, or potential member, of the network 150. As such, the network membership module 420 also performs an authentication function. Specifically, when the wireless sensor communication module 200 receives data from another wireless sensor communication module 200, the network membership module 420 can parse the data received to determine whether the received data was transmitted from a node that is presently a member of the network 150, or can be allowed membership within the network 150.

The final module to be described is the low-power media access module 422. The function of this module 422 is to allow the communication module 200 to access the transmission medium, which in the depicted embodiment is the RF spectrum, in accordance with a predetermined access schedule rather than allow random access. By providing access to the transmission medium in accordance with an access schedule, the wireless sensor communication modules 200 will likely use less power as compared to a configuration in which random access to the transmission medium is attempted.

The low-power media access module 422 may implement any one of numerous types of media access schedules. For example, the media access schedule may be implemented such that each wireless sensor communication module 200 in the network is allowed a predetermined number of attempts to access the transmission medium and, if after the predetermined number of attempts access fails, then the wireless sensor communication module 200 will place itself in a "sleep mode," to conserve power for future use. In a particular preferred embodiment, the low-power media access module 422 preferably implements a media access schedule that is similar to TDMA. In other words, each wireless sensor communication module 200 is assigned a given access time to the network 150. During its access time, the wireless sensor communication module 200 may attempt to gain access to the transmission medium either one or multiple times, as needed. Again, if access fails after a predetermined number of times, the wireless sensor communication module 200 may place itself in sleep mode. It will be appreciated that the low-power media access module 422 may also be configured such that the sensor communication module 300 will place itself in sleep mode whenever it is neither sending nor receiving data. This latter functionality can provide significant power savings.

Each of the modules described above, which are preferably implemented in software and executed by the processor 406, ensures that each wireless sensor communication module 200 transmits its sensor data via a data transmission path that will use the least amount of power. The modules also allow the engine controller 104 to know the physical location of the source of the sensor data, and the engine controller 104 and other nodes in the network 150 to know that the sensor data each is receiving originated from a node that is, or is allowed to become, a member of the network 150.

The communication section 206 of the wireless sensor communication module 200 is depicted in FIG. 4 as being implemented as two physically separate sections. It will be appreciated, however, that the communication controller 402 and transceiver 404 could be implemented in a single integrated circuit chip. Moreover, in a particular preferred embodiment, such an integrated circuit chip is implemented using Silicon On Insulator (SOI) technology, which will allow the integrated circuit chip to operate in temperature environments up to 250° C.

The wireless sensor communication module 200 and wireless sensor network 150, as was previously mentioned, are depicted and described herein as being implemented as part of an aircraft engine monitoring system and, more particular, an aircraft engine prognostic and health monitoring system. It will be appreciated, however, that the wireless sensor communication module 200 can be used in various other end-use environments. For example, the wireless sensor communication module 200 can form part of a sensor network that is used in a military environment, in which the wireless sensor communication module 200 is used to transmit sensor data from sensors that are used to monitor military equipment and/or personnel.

The wireless sensor communication network 150 described above was, for clarity and ease of description, illustrated and described assuming that each wireless sensor communication module 200 are only members of a single network. However, it should be appreciated that one or more wireless sensor communication modules 200 in the ad-hoc sensor communication network 150 could be a member of two or more sensor networks (not illustrated). This multiplicity of network membership could occur simultaneously, or at only selected times during the life of a wireless sensor communication module 200.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A wireless sensor communication module for operating in an ad-hoc sensor network having a plurality of nodes, the module comprising:
   a controller operable to supply identification data that uniquely identifies the module and configured to receive (i) power capability data representative of power capability of other wireless sensor communication modules in the sensor network and (ii) demodulated identification data, the controller operable, in response to these data, to (i) determine a data transmission route through the sensor network based at least in part on the power capability data, (ii) supply transmission route data representative thereof, and (iii) determine if the other communication modules are members of the sensor network; and
   a transceiver configured to receive sensor data and operable to modulate the sensor data with a radio frequency (RF) signal to thereby generate RF modulated sensor data, the transceiver additionally coupled to receive the transmission route data and operable, in response thereto, to transmit the RF modulated sensor data to a sensor network node in the determined transmission route, the transceiver further configured to receive (i) the identification data from the controller, (ii) RF modulated identification data from one or more of the other communication modules in the sensor network, (iii) RF modulated sensor data from one or more of the other sensor communications modules in the sensor network, and (iv) a retransmission command and further operable to (i) RF modulate the identification data, (ii) transmit the RF modulated identification data, demodulate the identification data therefrom, and retransmit the received RF modulated sensor data, wherein the controller is further operable to issue the retransmission command to the transceiver if it determines that the RF modulated sensor data received by the transceiver was transmitted from a communication module that is a member of the sensor network.

2. The module of claim 1, wherein the sensor network node in the determined transmission route is one of the other wireless sensor communication modules in the sensor network.

3. The module of claim 1, wherein the transceiver is further configured to receive RF modulated sensor data from one or more of the other sensor communication modules in the sensor network and is operable, in response thereto, to retransmit the received RF modulated sensor data.

4. The module of claim 3, wherein the transceiver retransmits the received RF modulated sensor data to a sensor network node in a transmission route determined by one of the other sensor communication modules.

5. The module of claim 1, wherein:
   the controller is further coupled to receive position data representative of a position of one or more of the other communication modules in the sensor network; and
   the controller is further operable to determine the data transmission route through the sensor network based at least in part on the power capability data and the position data.

6. The module of claim 5, wherein:
   the transceiver is configured to receive RF modulated position data from one or more of the other communication modules in the sensor network and operable to demodulate the position data therefrom; and
   the controller is coupled to receive the demodulated position data from the transceiver.

7. The module of claim 1, wherein:
   the controller is further operable to supply position data representative of its position in the sensor network; and
   the transceiver is coupled to receive the position data and is further operable to (i) RF modulate the position data and (ii) transmit the RF modulated position data.

8. The module of claim 1, wherein:
   the module is configured to be a member of multiple sensor networks; and
   the identification data further identifies the sensor network of which the module is a member.

9. The module of claim 1, wherein the controller is further coupled to receive identification data representative of a unique identifier associated with one or more of the other communication modules in the sensor network and operable, in response thereto, to determine whether the one or more other communication modules are members of the sensor network.

10. The module of claim 1, wherein the controller is:
    further configured to couple to a sensor and receive a sensor signal therefrom; and
    further operable to supply the sensor data to the transceiver.

11. The module of claim 1, wherein:
    the controller is further operable to issue a transmission command in accordance with a predetermined schedule; and
    the transceiver is coupled to receive the transmission command and operable, upon receipt thereof, to transmit the RF modulated sensor data to the sensor network node in the determined transmission route.

12. The module of claim 11, wherein:
the predetermined schedule includes a predetermined access time; and
the controller is further operable to issue a predetermined number of transmission commands during the predetermined access time.

13. The module if claim 12, wherein the controller is further operable to place the module in a sleep mode if the transceiver fails to transmit the RF modulated sensor data after the predetermined number of transmission commands are issued.

14. The module of claim 1, further comprising:
a power supply coupled to the transceiver and the controller and operable to supply power thereto.

15. The module of claim 14, wherein the power supply comprises an energy converter configured to convert mechanical energy to electrical energy.

16. The module of claim 15, wherein the energy convener includes at least a micro electro mechanical generator.

17. The module of claim 14, wherein the power supply comprises a thermoelectric generator.

18. The module of claim 1, wherein the sensor network node includes an aircraft engine controller.

19. The module of claim 1, wherein the wireless sensor communication module is formed as a single integrated circuit using silicon on insulator (SOI) technology.

20. The module of claim 1, wherein the transceiver is configured to implement at least Frequency Hopping Spread Spectrum (FHSS) radio transmission.

21. A wireless sensor communication module for operating in an ad-hoc sensor network having a plurality of nodes, the module comprising:
a sensor operable to sense a physical parameter and supply sensor data representative thereof;
a controller coupled to the sensor and configured to receive (i) the sensor data from the sensor and (ii) power capability data representative of power capability of other wireless sensor communication modules in the sensor network, the controller operable, in response to these data, to (i) transmit the sensor data received from the sensor, (ii) determine a data transmission route through the sensor network based at least in part on the power capability data, and (iii) supply transmission route data representative thereof; and
a transceiver configured to receive the sensor data from the controller and operable to modulate the sensor data with a radio frequency (RF) signal to thereby generate RF modulated sensor data, the transceiver additionally coupled to receive the transmission route data and operable, in response thereto, to transmit the RF modulated sensor data to a sensor network node in the determined transmission route.

22. The module of claim 21, wherein the sensor network node in the determined transmission route is one of the other wireless sensor communication modules in the sensor network.

23. The module of claim 21, wherein the transceiver is further configured to receive RF modulated sensor data from one or more of the other sensor communication modules in the sensor network and is operable, in response thereto, to retransmit the received RF modulated sensor data.

24. The module of claim 23, wherein the transceiver retransmits the received RF modulated sensor data to a sensor network node in a transmission route determined by one of the other sensor communication modules.

25. The module of claim 21, wherein:
the controller is further coupled to receive position data representative of a position of one or more of the other communication modules in the sensor network; and
the controller is further operable to determine the data transmission route through the sensor network based at least in part on the power capability data and the position data.

26. The module of claim 25 wherein:
the transceiver is configured to receive RF modulated position data from one or more of the other communication modules in the sensor network and operable to demodulate the position data therefrom; and
the controller is coupled to receive the demodulated position data from the transceiver.

27. The module of claim 21, wherein:
the controller is further operable to supply position data representative of its position in the sensor network; and
the transceiver is coupled to receive the position data and is further operable to (i) RF modulate the position data and (ii) transmit the RF modulated position data.

28. The module of claim 21, wherein:
the controller is further operable to supply identification data that uniquely identifies the module; and
the transceiver is coupled to receive the identification data and is further operable to (i) RF modulate the identification data and (ii) transmit the RF modulated identification data.

29. The module of claim 28, wherein:
the module is configured to be a member of multiple sensor networks; and
the identification data further identifies the sensor network of which the module is a member.

30. The module of claim 28, wherein:
the transceiver is configured to receive RF modulated identification data from one or more of the other communication modules in the sensor network and operable to demodulate the identification data therefrom; and
the controller is coupled to receive the demodulated identification data from the transceiver and operable, in response thereto, to determine if the other communication modules are members of the sensor network.

31. The module of claim 30, wherein:
the transceiver is further configured to receive RF modulated sensor data from one or more of the other sensor communication modules in the sensor network;
the controller is further responsive to the demodulated identification data to issue a retransmission command if it determines that the received RF modulated sensor data was transmitted from a communication module that is a member of the sensor network; and
the transceiver is further coupled to receive the retransmission command and operable, upon receipt thereof to retransmit the received RF modulated sensor data.

32. The module of claim 21, wherein the controller is further coupled to receive identification data representative of a unique identifier associated with one or more of the other communication modules in the sensor network and operable, in response thereto, to determine whether the one or more other communication modules are members of the sensor network.

33. The module of claim 21, wherein the controller is:
further configured to couple to a sensor and receive a sensor signal therefrom; and
further operable to supply the sensor data to the transceiver.

34. The module of claim 21, wherein:
the controller is further operable to issue a transmission command in accordance with a predetermined schedule; and
the transceiver is coupled to receive the transmission command and operable, upon receipt thereof, to transmit the RF modulated sensor data to the sensor network node in the determined transmission route.

35. The module of claim 34, wherein:
the predetermined schedule includes a predetermined access time; and
the controller is further operable to issue a predetermined number of transmission commands during the predetermined access time.

36. The module if claim 35, wherein the controller is further operable to place the module in a sleep mode if the transceiver fails to transmit the RF modulated sensor data after the predetermined number of transmission commands are issued.

37. The module of claim 21, further comprising:
a power supply coupled to the transceiver and the controller and operable to supply power thereto.

38. The module of claim 37, wherein the power supply comprises an energy converter configured to convert mechanical energy to electrical energy.

39. The module of claim 38, wherein the energy converter includes at least a micro electro mechanical generator.

40. The module of claim 37, wherein the power supply comprises a thermoelectric generator.

41. The module of claim 21, wherein the sensor network node includes an aircraft engine controller.

42. The module of claim 21, wherein the wireless sensor communication module is formed as a single integrated circuit using silicon on insulator (SOI) technology.

43. The module of claim 21, wherein the transceiver is configured to implement at least Frequency Hopping Spread Spectrum (FHSS) radio transmission.

44. An ad-hoc sensor communication network, comprising:
a plurality of wireless sensor communication modules, each communication module in operable communication with one or more other wireless sensor communication modules in the ad-hoc sensor communication network, each wireless sensor communication module comprising:
a sensor operable to sense a physical parameter and supply sensor data representative thereof,
a controller coupled to the sensor and configured to receive (i) the sensor data from the sensor and (ii) power capability data representative of power capability of other wireless sensor communication modules in the sensor network, the controller operable, in response to these data, to (i) transmit the sensor data received from the sensor, (ii) determine a data transmission route through the sensor network based at least in part on the power capability data, and (iii) supply transmission route data representative thereof, and
a transceiver configured to receive the sensor data from the controller and operable to modulate the sensor data with a radio frequency (RF) signal to thereby generate RF modulated sensor data, the transceiver additionally coupled to receive the transmission route data and operable, in response thereto, to transmit the RF modulated sensor data to a sensor network node in the determined transmission route.

45. An ad-hoc aircraft engine sensor communication network, comprising:
a plurality of wireless sensor communication modules, each communication module in operable communication with one or more other wireless sensor communication modules in the ad-hoc aircraft engine sensor communication network, each wireless sensor communication module comprising:
a sensor configured to couple to an aircraft engine and operable to sense a physical parameter associated with the aircraft engine and supply sensor data representative thereof,
a module controller coupled to the sensor and configured to receive (i) the sensor data from the sensor and (ii) power capability data representative of power capability of other wireless sensor communication modules in the aircraft engine sensor network, the controller operable, in response to these data, to (i) transmit the sensor data received from the sensor, (ii) determine a data transmission route through the sensor network based at least in part on the power capability data, and (iii) supply transmission route data representative thereof, and
a transceiver configured to receive the sensor data from the controller and operable to modulate the sensor data with a radio frequency (RF) signal to thereby generate RF modulated sensor data, the transceiver additionally coupled to receive the transmission route data and operable, in response thereto, to transmit the RF modulated sensor data to a network node in the determined transmission route.

46. A method of transmitting sensor data in an ad-hoc wireless sensor network having a plurality of nodes, each node having a power capability associated therewith, the method comprising the steps of:
determining, within each node, the power capability of at least a portion of the other nodes in the sensor network;
determining a data transmission route through the wireless sensor network based at least in part on the determined power capability;
radio frequency (RF) modulating sensor data to thereby generate RF modulated sensor data; and
transmitting the RF modulated sensor data to a node in the determined data transmission route.

47. The method of claim 46, further comprising:
receiving RF modulated sensor data from one or more of the other nodes in the sensor network; and
retransmitting the received RF modulated sensor data.

48. The method of claim 47, wherein the received RF modulated sensor data is retransmitted to a node in a transmission route determined by one of the other nodes in the network.

49. The method of claim 46, further comprising:
receiving position data representative of a position of one or more of the other nodes in the sensor network; and
determining the data transmission route through the sensor network based at least in part on the power capability data and the position data.

50. The method of claim 49, further comprising:
receiving RF modulated position data from one or more of the other nodes in the sensor network; and
demodulating the position data therefrom.

51. The method of claim 46, further comprising each node transmitting RF modulated position data representative of a position of the node in the sensor network.

52. The method of claim 51, further comprising each node transmitting unique RF modulated identification data.

53. The method of claim 52, wherein:
one or more of the nodes is configured to be a member of multiple sensor networks; and
the RF modulated identification data further identifies the sensor network of which the node is a member.

54. The method of claim 52, further comprising:
receiving RF modulated identification data from one or more of the other nodes in the sensor network;
demodulating the identification data therefrom; and
determining if the other nodes are members of the sensor network.

55. The method of claim 54, further comprising:
receiving RF modulated sensor data from one or more of the other nodes in the sensor network; and
retransmitting the received RF modulated sensor data if it is determined that the received RF modulated sensor data was transmitted from a node that is a member of the sensor network.

56. The method of claim 46, further comprising:
transmitting the RF modulated sensor data in accordance with a predetermined schedule.

57. A method of monitoring a plurality of physical parameters in an aircraft gas turbine engine, the method comprising the steps of:
sensing a plurality of physical parameters in the engine using a plurality of wireless sensors each having a power capability to thereby generate sensor data;
determining, within each wireless sensor, the power capability of each of the wireless sensors;
determining a data transmission route from each of the wireless sensors based at least in part on the determined power capability;
radio frequency (RF) modulating the sensor data to thereby generate RF modulated sensor data; and
transmitting the RF modulated sensor data from each of the wireless sensors via the determined data transmission routes.

58. A wireless sensor communication module for operating in an ad-hoc sensor network having a plurality of nodes, the module comprising:
a controller configured to receive power capability data representative of power capability of other wireless sensor communication modules in the sensor network and operable, in response thereto, to (i) determine a data transmission route through the sensor network based at least in part on the power capability data and (ii) supply transmission route data representative thereof, the controller further operable to issue a transmission command in accordance with a predetermined schedule; and
a transceiver configured to receive sensor data and operable to modulate the sensor data with a radio frequency (RF) signal to thereby generate RF modulated sensor data, the transceiver additionally coupled to receive the transmission route data and the transmission command and operable, in response thereto, to transmit the RF modulated sensor data to a sensor network node in the determined transmission route, wherein:
the predetermined schedule includes a predetermined access time,
the controller is further operable to issue a predetermined number of transmission commands during the predetermined access time, and
the controller is further operable to place the module in a sleep mode if the transceiver fails to transmit the RF modulated sensor data after the predetermined number of transmission commands are issued.

* * * * *

UNITED STATES PATENT AND TRADEMARK OFFICE
CERTIFICATE OF CORRECTION

PATENT NO. : 7,231,180 B2  
APPLICATION NO. : 10/808630  
DATED : June 12, 2007  
INVENTOR(S) : Benson et al.

Page 1 of 1

It is certified that error appears in the above-identified patent and that said Letters Patent is hereby corrected as shown below:

Column 13, line 7, "if" should be changed to --of--;  
Column 13, line 19, "convener" should be changed to --converter--;  
Column 14, line 54, "thereof to" should be changed to --thereof, to--.  
Column 15, line 15, "if" should be changed to --of--.

Signed and Sealed this

Ninth Day of October, 2007

JON W. DUDAS  
*Director of the United States Patent and Trademark Office*